Jan. 27, 1959
B. F. VOIGT
2,870,877
AUTOMATIC CLEARANCE SETTER
Filed July 22, 1955
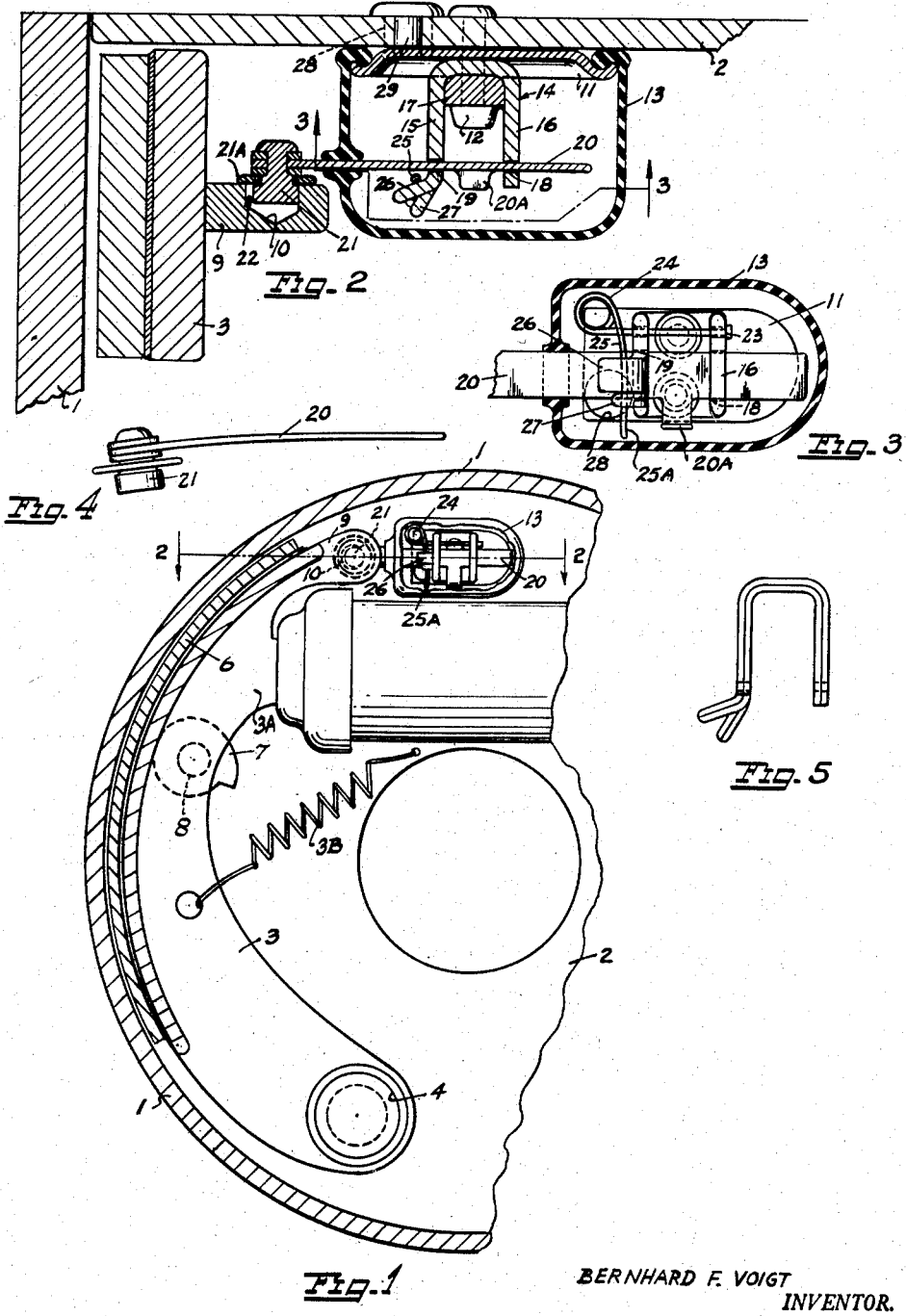
BERNHARD F. VOIGT
INVENTOR.
BY James Givran
ATT'Y

United States Patent Office 2,870,877
Patented Jan. 27, 1959

2,870,877

AUTOMATIC CLEARANCE SETTER

Bernhard F. Voigt, Corvallis, Oreg.

Application July 22, 1955, Serial No. 523,721

3 Claims. (Cl. 188—196)

This invention relates to automatic clearance setting devices, external and accessory of the operative means of a frictional driven or retarded, grinding, or cutting machine wherein the loss of material from application and/or release tend to cause an increasing clearance between stationary, sliding or revolving parts thereof, to automatically restrict the aforesaid clearance to a predetermined value, and when used in conjunction with a means of follow-up, compensation or other automatic or manual take-up to automatically compensate for the otherwise increasing clearance from the aforesaid loss of material.

The invention is hereinafter shown and described in connection with a hydraulically operated compensating mastered cylindered automotive brake system as one of its uses wherein the principal objects of the invention are as follows:

To provide a clearance setter which is entirely automatic and constant in its operation and which may be readily installed external to a hydraulic system and/or means of application and release of the brake, and which is of such design that it may be readily installed upon the backing plates in convenient and available locations of existing brakes with no change to the hydraulic cylinders and little or no change to any other component part thereof.

To provide a clearance setter of this character which will eliminate the necessity of periodic readjustment for wear, and by maintenance of a constant point of application permit greatly increased mechanical advantage in operational leverage and increasing mechanical advantage with increasing application pressure.

To provide a setter which is shock-proof and vibration-proof and wherein the greatest force that could be applied to it would be that of the brake-releasing pressure (such as that of the conventional brake return spring) and one that does not have any force of application pressure.

To include a wear-limit warning feature which will permit the clearance to increase with further wear after the brake lining has reached a predetermined thinness and thereby provide warning without impairment of braking ability.

To include a means of release of accumulated take-up accessible from the exterior of the brake enclosure to permit removal of the brake drum when lands of the lining are worn into the grooves of the drum.

To not interfere with nor necessitate the removal of the eccentric adjustments commonly supplied for the centering of the brake shoes upon installation and manual adjustment for wear.

The foregoing and other objects will appear as my invention is more fully hereinafter described in the following specification, illustrated in the accompanying drawing, and finally pointed out in the appended claims.

In the accompanying drawing:

Figure 1 is a fragmentary view of a backing plate and a brake drum showing my new and improved setter secured to the backing plate and operatively connected to a brake shoe cooperating with the brake drum. A fragment of a protective hood is shown broken away for convenience of illustration.

Figure 2 is an enlarged sectional plan view taken approximately along the line 2—2 of Figure 1.

Figure 3 is a sectional front view taken approximately along the line 3—3 of Figure 2.

Figure 4 is a detail view of a locking bar.

Figure 5 is a detail view of a modified form of U-shaped bracket.

Referring now more particularly to the drawing:

In Figure 1 reference numeral 1 indicates a brake drum rotatable with respect to a backing plate 2. A brake shoe 3 is pivotally attached to the backing plate as at 4 and provided with brake lining 6 for operative application to the brake drum in accordance with pressures against the projection 3A formed on the brake shoe and bearing against a piston within a hydraulic wheel cylinder motor connected to a compensating hydraulic generator or master cylinder. The brake shoe is retractable from the brake drum by a brake shoe return spring 3B, and centered thereto in respect to relative radii by the adjustment cam 7 rotatably attached as at 8 to the backing plate all in the conventional manner. The flange 9 of the brake shoe 3 has a cavity 10 formed therein.

The invention comprises a base 11 positioned by rivets 12 or other suitable means and rolled about its marginal edges to retain a flexible protective hood 13. A U-shaped bracket 14 having leg portions 15 and 16 and a reinforcing block 17 is secured to the backing plate along with the base 11 therebetween by said rivets. The outer ends of the legs are slotted as at 18 and 19 to receive a locking bar 20 having a projection 20A turned rightabout at a point thereon in spaced relations proportional to a predetermined operational loss of material. The locking bar has an inherent slight curvature as shown in Figure 4 and is provided at its outer end with a stud 21 about which a loosely attached washer 21A of sufficiently greater diameter to cover said cavity 10 in the flange of the brake shoe positions the lesser diametered stud for lateral engagements with the intermediate diametered cavity. The difference in diameter between that of the cavity and that of the stud as measured in the plane of motion and indicated generally at 22 proportionally corresponds in spaced relations to a thereby predetermined clearance between the brake drum and the brake lining. Secured as at 23 to the leg 16 and extending through both legs of the bracket is one end of a coiled spring 24 whose opposite end 25 is turned downwardly as shown to provide an appendant lever 25A extending below the locking bar. Any inward movement of the locking bar is normally prevented by the disposal of the spring between a turned portion 26 of the leg 15 and its adjacent face of the locking bar. A portion 27 of the leg below its turned portion 26 is also turned outwardly but to a lesser angle to provide convenient placement therebetween for the lever 25A if ever the device is to be rendered inoperative. Access to the lever may be had through an opening 28 normally closed by a plug or screw 29.

Initially, the rake shoe having been fitted to the brake drum by eccentric cam or any conventional method and the stud recessed in the cavity, the locking bar is manipulated to the right as viewed in the drawing and the downward portion of the spring 24 is placed in its operative position, i. e. self-sprung to the right and between the portion 26 of the leg 15 and the locking bar. Application of the brake engages the stud and draws the locking bar with negligible resistance past the spring and through the slotted ends of the bracket in spaced proportion to any operative loss of material and the pressure of the spring triggers a self-engaging frictional embrace that normally prevents return movement of the locking bar and thereby limits the free movement of the brake shoe to the space afforded by the difference in dimension in the plane of motion between stud and cavity.

Accordingly, the locking bar is drawn out in proportion to any operative loss of material, however small it may be, a spring induced locking action aggregates such movements, and a uniform clearance between the brake drum and the brake lining follows every complete release of application, until the extension 25A of the spring is contacted by the projection 20A of the locking bar whereupon the spring moves outward therewith upon further operative loss of material and there can be no further increase to the prior aggregate which continues to be held as any application is being fully released when the spring returns to its normal operative position.

Thermo-malfunction may be prevented by inherent self-compensating curvatures by constructing the U-shaped bracket of an outer lamination curved about and secured to an inner lamination having a different thermo-coefficient of expansion as shown in Figure 5.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

1. In machines normally subject to operational loss of material and thereby increasing clearances between cooperating elements thereof upon their operational separation and provided with means of compensation upon readjustment for said clearance, a device of the character described comprising a bracket fixedly secured to one element of the machine, a locking bar adjustably attached to the bracket and extending outwardly therefrom, said locking bar having a projection formed thereon and a stud provided at one end of the locking bar, a cavity of greater dimension than that of said stud formed within an actuating lever of the machine, said lever connected thereby to the locking bar to provide a space between said stud and the wall of the cavity, angular projections formed on the bracket and directed toward the studded end of the locking bar, a spring secured at one of its ends to said bracket and having its other end operatively engaged between one of said angular projections and the locking bar to remain wedged therebetween against movement of the locking bar in one direction and to permit freedom of movement thereof in an opposite direction, whereby said movements will accumulate and their aggregate equal that necessary to balance all operational loss of material and to maintain said spaced relation regardless of any change in the shape of cooperating elements incidental to said loss of material and said other end of said spring being adapted for manual placement between said one of said angular projections and the other thereof to render the device inoperative if so desired.

2. In a machine subject to an operational loss of material and thereby increasing clearances between its cooperating elements upon their operational separation and provided with means of compensation upon readjustment for said clearance, a device of the character described comprising a bracket fixedly secured to one element of the machine, a locking bar adjustably attached to the bracket and extending outwardly therefrom, a projection turned right about from the locking bar at a point thereon relative to a predetermined operational loss of material, a stud provided at one end of the locking bar cooperating with a cavity of greater dimension in its plane of motion formed within an actuating lever of the machine, angular projections formed on the bracket and directed toward the studded end of the locking bar, a spring transversely directed between the locking bar and one of said angular projections of the bracket and extended therebelow as an appendant lever, said transverse portion of the spring operatively engaged to permit freedom of movement of the locking bar in one direction and to restrain its movement in the opposite direction, whereby an aggregate of movements accrues with corresponding operational losses of material while said spaced relation between cooperating elements of the machine remains limited to a value predetermined by said difference in dimension between the stud and the cavity until said projection of the locking bar contacts said appendant lever and moves the same out of its operative engagement with said locking bar and said one of said angular projections, and said appendant lever being adapted for manual placement between said one of said angular projections and the other thereof to render the device inoperative if so desired.

3. A device for automatically setting predetermined clearances between cooperating elements of a machine normally subjected to operational loss of material therebetween and thereby increasing clearance therebetween upon their operational separation, said device comprising a bracket fixedly secured with respect to one element of the machine, a locking element adjustably attached to the bracket and extending outwardly therefrom, a stud attached at the end of said locking element and projected into an opening formed within an actuated lever of the machine, said opening having a greater dimension as measured in the planes of motion of said actuated lever than that of the stud, whereby the locking element will be pulled by the actuated lever in one direction and released therefrom upon movement of the actuated lever in the opposite direction, means carried by the bracket and engageable with said locking element to establish a limit stop for the movement of the actuated lever in said opposite direction and for the extent thereof, and said bracket comprising an outer lamination secured to an inner lamination having a different thermo-coefficient of expansion whereby thermo-malfunction of the device will be prevented.

References Cited in the file of this patent
UNITED STATES PATENTS

| | | |
|---|---|---|
| 2,291,662 | Thibeault | Aug. 4, 1942 |
| 2,670,058 | Landrum | Feb. 23, 1954 |